US008026817B2

(12) United States Patent
Bauchot et al.

(10) Patent No.: US 8,026,817 B2
(45) Date of Patent: Sep. 27, 2011

(54) RFID TAG POSITIONAL ADDRESSING

(75) Inventors: Frederic Bauchot, Saint-Jeannet (FR);
Gerard Marmigere, Drap (FR);
Joaquin Picon, St. Laurent du Var (FR);
Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/267,830

(22) Filed: Nov. 10, 2008

(65) Prior Publication Data
US 2010/0097185 A1 Apr. 22, 2010

(30) Foreign Application Priority Data

Oct. 17, 2008 (EP) .................................... 08305697

(51) Int. Cl.
*G08B 13/14* (2006.01)
(52) U.S. Cl. ................ 340/572.4; 340/572.1; 340/572.8
(58) Field of Classification Search .............. 340/572.1, 340/572.4, 572.8, 568.1, 539.11, 539.13, 340/539.21, 539.23, 10.1, 10.42, 825.49; 235/383, 384, 385; 229/120.26
See application file for complete search history.

(56) References Cited

U.S. PATENT DOCUMENTS

| | | | |
|---|---|---|---|
| 4,226,357 A | 10/1980 | Martin | |
| 7,030,731 B2 * | 4/2006 | Lastinger et al. | ............ 340/10.1 |
| 7,212,121 B2 | 5/2007 | Hashimoto et al. | |
| 7,286,043 B2 | 10/2007 | Carrender et al. | |
| 7,504,949 B1 | 3/2009 | Rouaix et al. | |
| 7,639,119 B2 | 12/2009 | Carrender et al. | |
| 7,768,409 B2 | 8/2010 | Parias | |
| 7,812,719 B2 * | 10/2010 | Djuric et al. | ............. 340/539.13 |
| 2002/0196126 A1 | 12/2002 | Eisenberg et al. | |
| 2003/0227385 A1 | 12/2003 | Lancaster | |
| 2004/0212480 A1 | 10/2004 | Carrender et al. | |
| 2005/0275531 A1 | 12/2005 | Johnson | |
| 2006/0022038 A1 * | 2/2006 | Hewlin et al. | ................ 235/385 |
| 2008/0303682 A1 * | 12/2008 | Han | ......................... 340/686.1 |
| 2009/0102661 A1 * | 4/2009 | Barnes et al. | ............. 340/572.1 |
| 2009/0322486 A1 * | 12/2009 | Gerstel | ...................... 340/10.1 |
| 2010/0030667 A1 | 2/2010 | Chudy et al. | |

OTHER PUBLICATIONS

Previl, U.S. Appl. No. 12/267,749, Office Action Communication, FR920080197US1, Jan. 31, 2011, 14 pages.
Trieu, U.S. Appl. No. 12/267,712, Office Action Communication, FR920080141US1, Dec. 20, 2010, 16 pages.
Previl, U.S. Appl. No. 12/267,749, Office Action Communication, FR920080197US1, May 6, 2011, 12 pages.
Trieu, Van Thanh, U.S. Appl. No. 12/267,712, Office Action Communication, FR920080141US1, Apr. 20, 2011, 12 pages.

* cited by examiner

*Primary Examiner* — Van T. Trieu
(74) *Attorney, Agent, or Firm* — Douglas Lashmit; Hoffman Warnick LLC

(57) ABSTRACT

The present invention is directed to a method and apparatus for radio frequency identification (RFID) tag positional addressing. A method in accordance with an embodiment of the present invention includes: activating a plurality of first RFID tags, wherein each first RFID tag emits an identification (ID) and a position; capturing the IDs and positions emitted by the first RFID tags using a plurality of second RFID tags, wherein each second RFID tag captures the IDs and positions emitted by the first RFID tags located in a vicinity of the second RFID tag, and wherein each second RFID tag determines its physical location based on the captured IDs and positions; and sending a read command including a position of a targeted one of the second RFID tags that is to be read, wherein only the targeted second RFID tag located at the position in the read command responds to the read command.

16 Claims, 4 Drawing Sheets

RFID TAG POSITIONAL ADDRESSING

CROSS-REFERENCE TO RELATED APPLICATIONS

This application is related in some aspects to co-pending patent application Ser. No. 12/267,712, filed Nov. 10, 2008, entitled "Method and Apparatus for Reading Short Distance Emission RFID Tags to Locate Items in a Container," and co-pending patent application Ser. No. 12/267,749, filed Nov. 10, 2008, entitled "Method and Apparatus for Visually Locating Short Distance Emission RFID Tags to Locate Items in a Container," which are hereby incorporated by reference.

FIELD OF THE INVENTION

The present invention relates to radio frequency identification (RFID) tags. More specifically, the present invention is directed to RFID tag positional addressing.

BACKGROUND OF THE INVENTION

RFID technology is often used to determine which tagged items are within the reading field of an RFID reader. A tagged item is typically identified by a simple ID stored in the RFID tag associated with the item. The RFID tag can also include additional information relative to the tagged item.

Knowing the position of a tagged item, and being able to read the data stored in the RFID tag attached to the item, is useful, for example, for inventory and/or retrieval purposes. Currently, position determination is provided by active (i.e., battery powered) RFID tags. Unfortunately, active RFID tags cannot be used in conjuction with numerous small items all located in a small area.

When many small items equipped with RFID tags are in the reading field of an RFID reader, it is necessary to use an "anti-collision" mechanism to read each individual RFID tag. Although many anti-collision mechanisms exist, they are designed to read all of the RFID tags present in the reading field of an RFID reader, and are incapable of selectively reading an RFID tag located at a predetermined position. To this extent, it is not possible to only read the information of an RFID tag in a given (geographical) position, without being disturbed by information sent by other RFID tags in the reading field of an RFID reader.

SUMMARY OF THE INVENTION

The present invention is directed to RFID tag positional addressing.

A first aspect of the present invention is directed to a method for radio frequency identification (RFID) tag positional addressing, comprising: activating a plurality of first RFID tags, wherein each first RFID tag emits an identification (ID) and a position; capturing the IDs and positions emitted by the first RFID tags using a plurality of second RFID tags, wherein each second RFID tag captures the IDs and positions emitted by the first RFID tags located in a vicinity of the second RFID tag, and wherein each second RFID tag determines its physical location based on the captured IDs and positions; and sending a read command including a position of a targeted one of the second RFID tags that is to be read, wherein only the targeted second RFID tag located at the position in the read command responds to the read command.

A second aspect of the present invention is directed to a system for radio frequency identification (RFID) tag positional addressing, comprising: an RFID reader for activating a plurality of first RFID tags, wherein each first RFID tag emits an identification (ID) and a position; a plurality of second RFID tags for capturing the IDs and positions emitted by the first RFID tags, wherein each second RFID tag captures the IDs and positions emitted by the first RFID tags located in a vicinity of the second RFID tag, and wherein each second RFID tag determines its physical location based on the captured IDs and positions; and a system for sending a read command including a position of a targeted one of the second RFID tags that is to be read, wherein only the targeted second RFID tag located at the position in the read command responds to the read command.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
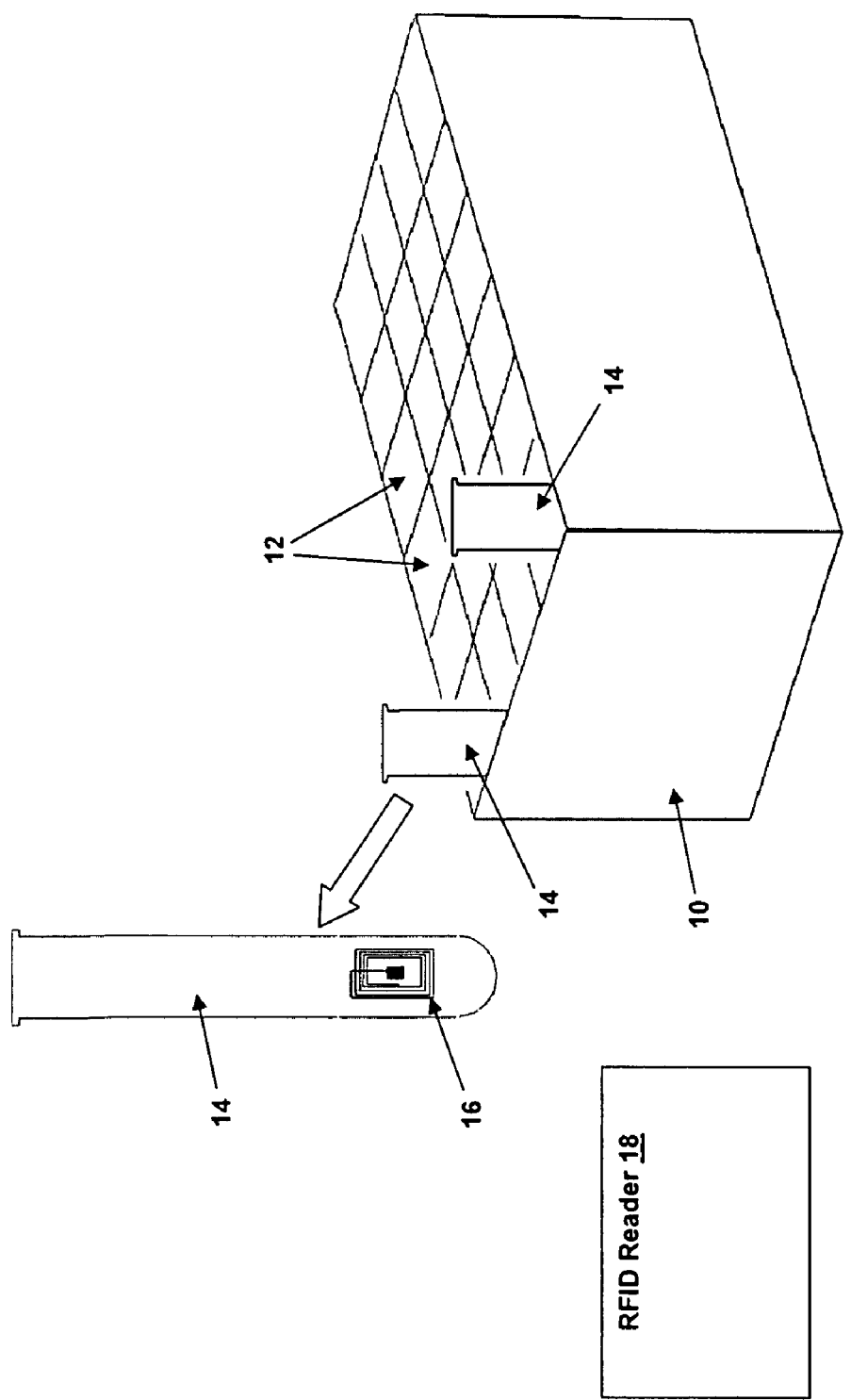
FIG. 1 depicts a system for RFID tag positional addressing in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to RFID tag positional addressing.

As depicted in FIG. 1, a container 10 (e.g., a box) is divided into a plurality of compartments 12 (e.g., rectangular in shape) in which items 14 are stored. In this example, the items 14 comprise small test tubes containing samples, while the container 10 and the compartments 12 are rectangular in shape. However, it will be apparent to one skilled in the art that the present invention can be applied in any type of environment to any type of container containing any type of item(s).

Each item 14 is equipped with an RFID tag 16, hereafter referred to as an M-tag 16 (M=mobile). The M-tags 16 can be provided on the items 14 using any now known or later developed methodology. Each M-tag 16 includes a processor capable of performing at least the basic computations required in the practice of the present invention.

Figure 2:
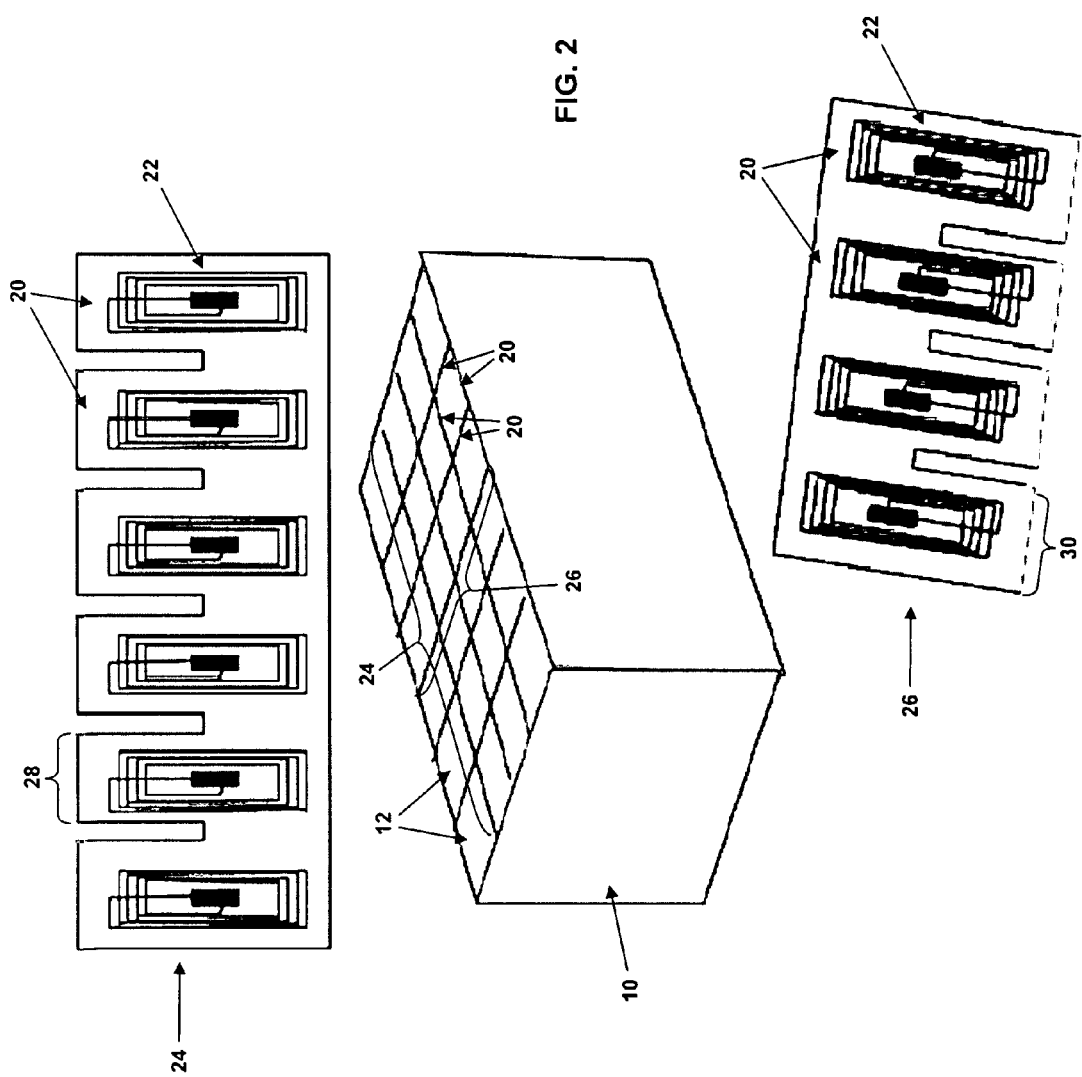
FIG. 2 depicts an illustrative container in accordance with an embodiment of the present invention.

As depicted in FIG. 2, each compartment 12 of the container 10 has a plurality of faces 20. The faces 20 of the compartments 12 are equipped with RFID tags 22, hereafter referred to as F-tags 22 (F=fixed). The F-tags 22 can be provided on the faces 20 of the compartments 12 using any now known or later developed methodology. As will be described below in greater detail, the F-tags 22 provided on the faces 20 of a given compartment 12 can be used to precisely identify and locate the compartment 12 in the container 10.

In this embodiment, the compartments 12 are formed using a plurality of first and second dividers 24, 26, wherein the first dividers 24 comprise a plurality of fingers 28, while the second dividers 26 comprise a plurality of fingers 30. When the first and second dividers 24, 26 are positioned in the container 10, the plurality of fingers 28, 30 form the faces 20 of the compartments 12. An F-tag 22 is provided on at least one side of each finger 28, 30. Other techniques for forming the compartments 12 are within the purview of one skilled in the art.

The present invention uses the capability of an M-tag 16 to listen to surrounding F-tags 22 to obtain the IDs and relative positions of the surrounding F-tags 22. Based on this information, an M-tag 16 can deduce its current position in the container 10. An RFID reader 18 subsequently sends a read command including the position of a specific M-tag 16 in the container 10 that it wants to read. In response, the M-tag 16 at that position in the container 10 responds to the RFID reader 18 and sends the RFID reader 18 the contents of its memory, while all other M-tags 16 do not respond and remain quiet.

In accordance with an embodiment of the present invention, this reading process occurs in two phases. In a first phase, when the RFID reader 18 wants to read an M-tag 16 on an item 14 at a given position in the container 10, it (or another suitable source) emits a signal (e.g., low frequency) at a random pace, during a given time period, to power up the M-tags 16 and F-tags 22 in the container. In response, the F-tags 22 begin emitting, at a very low power, their IDs and their relative positions in the container 10. Since each F-tag 22 has a very short emission range, only the M-tags 16 located in the vicinity of the F-tag 22 can capture the information emitted by the F-tag 22. Based on information emitted by the F-tags 22 and captured by the M-tags 16, each M-tag 16 can determine its current position (e.g., x,y) in the container 10. In a subsequent phase, the RFID reader 18 sends a read command including the position information (e.g., $x_j, y_j$) of a specific M-tag 16 it wants to read. Upon recognizing its position information, the targeted M-tag 16 responds to the RFID reader 18, while all other M-tags 16 remain quiet (i.e., do not respond to the RFID reader 18).

Figure 3:
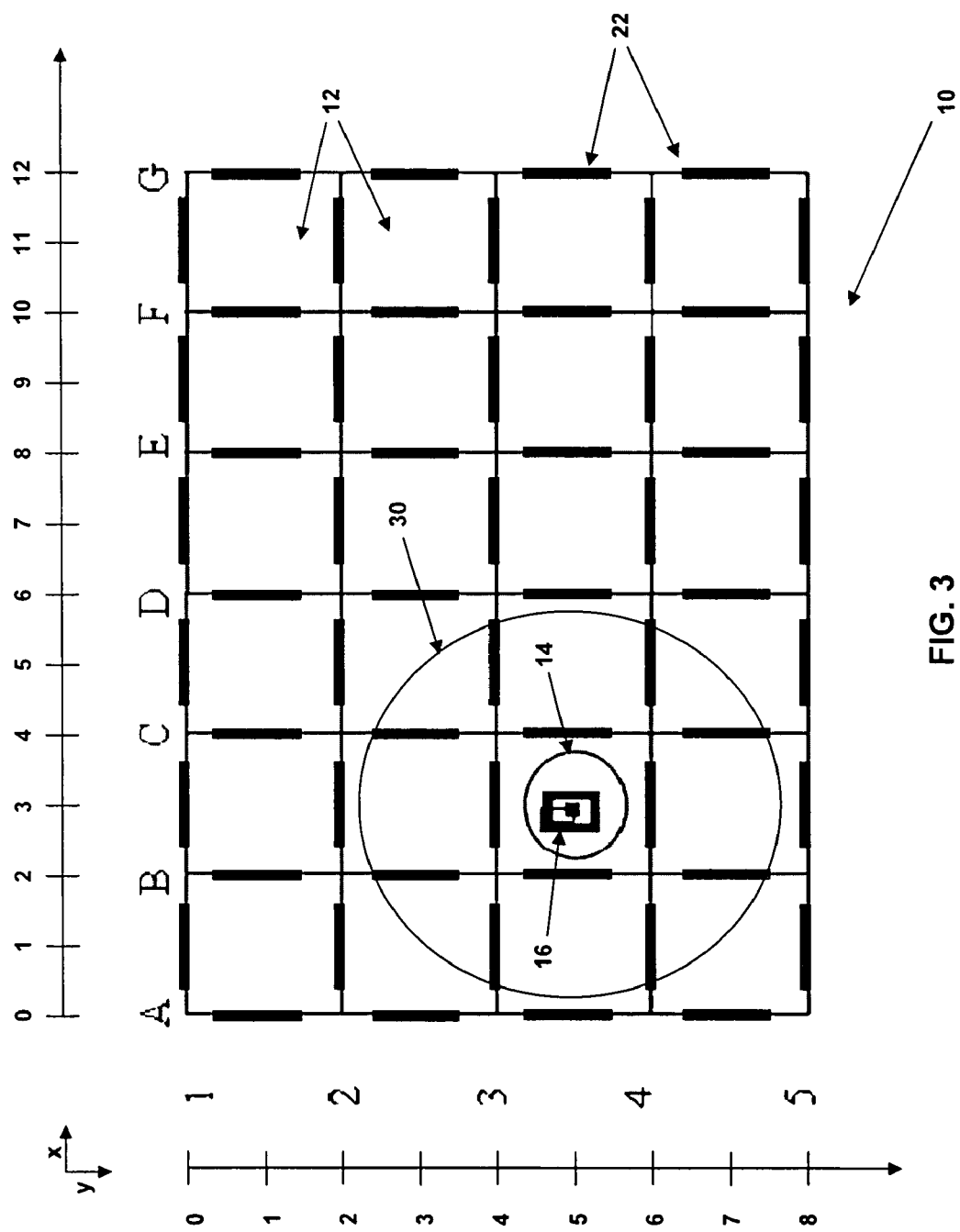
FIG. 3 depicts a plan view of the container of FIG. 2, in accordance with an embodiment of the present invention.

A plan view of a container 10 is depicted in FIG. 3. As shown, the portions (e.g., sides/dividers) of the container 10 extending vertically in FIG. 3 are labeled using the letters A, B, C, . . . , while the portions (e.g., sides/dividers) of the container 10 extending horizontally in FIG. 3 are labeled using the numbers 1, 2, 3, . . . . Each F-tag 22 located on a horizontally-extending portion of the container 10 is named using the line number associated with that portion, followed by the two letters of the vertically-extending portions that enclose the F-tag 22. For instance, the F-tag 22 located on the horizontally-extending portion designated "1" between the vertically-extending portions designated "A" and "B", is named "1AB". In a similar manner, each F-tag 22 located on a vertically-extending portion of the container 10 is named using the letter associated with that portion, followed by the two numbers of the horizontally-extending portions that enclose the F-tag 22. For instance, the F-tag 22 located on the vertically-extending portion designated "A" between the horizontally-extending portions designated "2" and "3", is named "A23". Based on this naming convention, the M-tag 16 on an item 14 in the container 10 is identified by the two letters and two numbers of the portions of the container 10 that enclose the item 14. For example, the item 14 shown in the container 10 in FIG. 3 is identified as "BC34".

FIG. 3 depicts an item 14 in the container 10 with an M-tag 16 identified as BC34 receiving signals emitted from the F-tags 22 located within a range of coverage 30. In this example, the M-tag 16 identified as BC34 receives the signals emitted by the F-tags 22 designated B23, C23, 3AB, 3BC, 3CD, B34, C34, 4AB, 4BC, 4CD, B45 and C45. The coordinates (x,y) of the F-tags 22 designated B23, C23, 3AB, 3BC, 3CD, B34, C34, 4AB, 4BC, 4CD, B45 and C45 are (2,3), (4,3), (1,4), (3,4), (5,4), (2,5), (4,5), (1,6), (3,6), (5,6), (2,7), (4,7), respectively.

The (x,y) coordinates of the M-tag 16 identified as BC34 (and associated item 14) in the container 10 in FIG. 3 are calculated by the M-tag 16 as follows:

$$\text{Item\_Tag}X = \frac{\sum X}{\text{Tag\_count}} \quad \text{(EQU. 1)}$$

and $$\text{Item\_Tag}Y = \frac{\sum Y}{\text{Tag\_count}} \quad \text{(EQU. 2)}$$

where
Item_TagX is the x coordinate of the item 14;
Item_TagY is the y coordinate of the item 14;
SumX is the sum of the x coordinates of the F-tags 22;
SumY is the sum of the y coordinates of the F-tags 22; and
Tag_Count is the number of F-tags 22 within the range of coverage 30.

In FIG. 3, based on the above equations, the (x,y) coordinates of the M-tag 16 identified as BC34 (and associated item 14) in the container 10 are determined to be:

$x=36/12=3$; and $y=60/12=5$.

Thus, the M-tag 16 determines that its location in the container in FIG. 3 is (3,5). When the RFID reader 18 subsequently sends a read command including the position information (3,5) of the M-tag 16, the M-tag 16 at location (3,5) responds to the RFID reader 18 (e.g., by sending the RFID reader 18 the contents of its memory).

Figure 4:
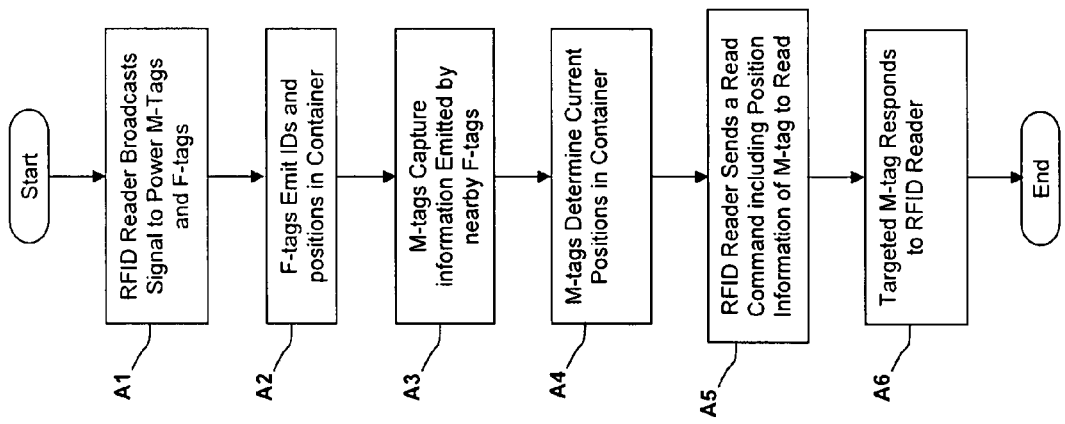
FIG. 4 depicts an illustrative process in accordance with an embodiment of the present invention.

A flow diagram of an illustrative process in accordance with an embodiment of the present invention is depicted in FIG. 4. At A1, the RFID reader 18 broadcasts a low frequency signal to provide power to the M-tags 16 and the F-Tags 22. At A2, the F-tags emit their IDs and (x,y) positions in the container 20. At A3, the M-tags 16 capture the information emitted by nearby F-tags 22. At A4, the M-tags 16 determine their current (x,y) positions in the container. At A5, the RFID reader 18 sends a read command including the position information ($x_j, y_j$) of a specific M-tag 16 it wants to read. At A6, upon recognizing its position information, the targeted M-tag 16 responds to the RFID reader 18 and sends the RFID reader 18 the contents of its memory.

The present invention can be used to selectively read the memory of a targeted RFID tag on an item by indicating the specific coordinates (e.g., x,y) of the targeted item in a read command. If no item is present in the (x,y) location, the RFID reader receives no answer and can determine that the targeted location in the container is empty. The present invention can be used for an inventory system, and can also be used as an "anti-collision" mechanism by an RFID reader by reading successively all possible (x,y) locations.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for radio frequency identification (RFID) tag positional addressing, comprising:
   receiving an activating signal broadcast by an RFID reader, the activating signal activating a plurality of first RFID tags and a plurality of second RFID tags, wherein each first RFID tag emits an identification (ID) and a position in response to the activating signal;
   capturing the IDs and positions emitted by the first RFID tags using the plurality of second RFID tags, wherein each second RFID tag captures the IDs and positions emitted by the first RFID tags located in a vicinity of the second RFID tag, and wherein each second RFID tag determines its physical location based on the captured IDs and positions; and
   the RFID reader sending a read command, the read command including a position of a targeted one of the second RFID tags that is to be read by the RFID reader, wherein only the targeted second RFID tag located at the position in the read command responds to the read command.

2. The method of claim 1, wherein the position comprises a position in a container.

3. The method of claim 2, wherein the container comprises a plurality of compartments, each compartment comprising a plurality of faces.

4. The method of claim 3, further comprising:
   providing each face of each compartment of the container with one of the first RFID tags.

5. The method of claim 4, wherein the position emitted by each first RFID tag comprises coordinates of the first RFID tag within the container.

6. The method of claim 3, wherein each second RFID tag is associated with an item located in a compartment in the container.

7. The method of claim 3, wherein the compartments are rectangular.

8. The method of claim 7, further comprising:
   forming the compartments using a plurality of dividers, wherein each divider comprises a plurality of fingers; and
   forming the faces of the compartments using a plurality of the fingers of the dividers.

9. A system for radio frequency identification (RFID) tag positional addressing, comprising:
   an RFID reader for broadcasting an activating signal, the activating signal activating a plurality of first RFID tags and a plurality of second RFID tags, wherein each first RFID tag emits an identification (ID) and a position in response to the activating signal;
   the plurality of second RFID tags capturing the IDs and positions emitted by the first RFID tags, wherein each second RFID tag captures the IDs and positions emitted by the first RFID tags located in a vicinity of the second RFID tag, and wherein each second RFID tag determines its physical location based on the captured IDs and positions; and
   the RFID reader sending a read command including a position of a targeted one of the second RFID tags that is to be read, wherein only the targeted second RFID tag located at the position in the read command responds to the read command.

10. The system of claim 9, wherein the position comprises a position in a container.

11. The system of claim 10, wherein the container comprises a plurality of compartments, each compartment comprising a plurality of faces.

12. The system of claim 11, wherein each face of each compartment of the container is provided with one of the first RFID tags.

13. The system of claim 12, wherein the position emitted by each first RFID tag comprises coordinates of the first RFID tag within the container.

14. The system of claim 11, wherein each second RFID tag is associated with an item located in a compartment in the container.

15. The system of claim 11, wherein the compartments are rectangular.

16. The system of claim 15, further comprising:
   a plurality of dividers for forming the compartments, wherein each divider comprises a plurality of fingers, and wherein the fingers form the faces of the compartments.

* * * * *